United States Patent [19]

Harkness

[11] Patent Number: 4,755,409

[45] Date of Patent: Jul. 5, 1988

[54] WATERPROOFING LAMINATE

[75] Inventor: Alex W. Harkness, Gibsonia, Pa.

[73] Assignee: Hyload Corporation, Pittsburgh, Pa.

[21] Appl. No.: 822,209

[22] Filed: Jan. 24, 1986

[51] Int. Cl.$^4$ .......................... B32B 11/04; C09J 7/02; D06N 5/00

[52] U.S. Cl. ...................................... 428/40; 428/352; 428/489; 428/493; 428/494; 428/495

[58] Field of Search ................. 428/468, 489, 492, 40, 428/500, 493, 494, 495; 524/66; 156/352, 279

[56] References Cited

U.S. PATENT DOCUMENTS

| | | | |
|---|---|---|---|
| 3,952,137 | 4/1976 | Turler | 428/489 |
| 4,039,706 | 8/1977 | Tajima et al. | 428/40 |
| 4,046,945 | 9/1977 | Barmann et al. | 428/500 X |
| 4,055,453 | 10/1977 | Tajima et al. | 428/40 X |
| 4,091,135 | 5/1978 | Tajima et al. | 428/40 |
| 4,458,043 | 7/1984 | Evans et al. | 524/66 |
| 4,600,635 | 7/1986 | Wiercinski et al. | 428/489 X |

Primary Examiner—Thomas J. Herbert
Attorney, Agent, or Firm—Arnold B. Silverman

[57] ABSTRACT

A waterproofing laminate suitable for use in roofs, floors or other surfaces where waterproofing is desired contains a reinforcing sheet, first and second bitumen layers secured to opposite surfaces of the reinforcing sheet, first and second compound bitumen layers secured to the bitumen layers, an elastomeric sheet secured to the first compound bitumen layer and a release sheet secured to the second compound bitumen layer. Certain preferred materials for use in the laminate are recited.

5 Claims, 1 Drawing Sheet

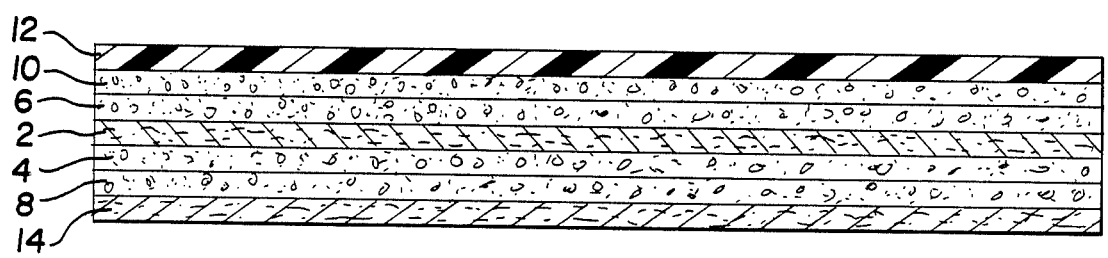

WATERPROOFING LAMINATE

BACKGROUND OF THE INVENTION

1. Field Of The Invention

This invention relates to an improved waterproofing laminate and, more specifically, it relates to such laminates which are particularly useful in connection with waterproofing of building surfaces such as roofs, floors and other surfaces wherein it is desired to resist penetration of water or water vapor.

2. Description Of The Prior Art

It has been known to employ in various roofing systems built-up roofing. Such systems may include a layer of bituminous roofing felt, a bitumen layer coated on one or both surfaces of the felt and a material such as gravel, sand or the like which is deposited on an exposed bitumen layer. Among the problems found in such systems is that they require extensive field labor, tend to lack uniformity in respect of structural nature and effectiveness from zone to zone and may not perform effectively under a wide variety of climatic conditions.

It has also been known to employ waterproof sheeting which has been applied to a substrate such as a roof substrate using molten bitumen or cold applied bituminous adhesives. Among the problems with such approaches is the failure of the elastomeric sheeting to maintain dimensional stability and avoid wrinkling when bonded with hot bitumen. Also, depending upon the conditions at the time of application the adhesive bond can vary in effectiveness substantially. On slopes greater than about 10 degrees it is generally necessary to employ mechanical fasteners to secure the membrane in place. Such membranes must generally be left exposed for periods in excess of about 30 days before painting in order to permit the adhesive to cure completely. Such adhesively securd elastomeric sheetings also can generally not be applied directly to insulation, wood, metal, concrete and other materials. Also, in warm weather the temperature of the roof can reach such a level that the adhesive liquifies.

It has been known to provide laminated roofing membranes which contain bitumen coated layers and compound bitumen coated layers. See U.S. Pat. Nos. 4,055,453 and 4,091,135 the disclosures of which are expressly incorporated herein by reference.

It has been known that elastomeric materials such as natural or synthetic rubber and bituminous materials tend to be incompatible and that bituminous materials will tend to attack and degrade elastomeric materials.

There remains, therefore, a very real and substantial need for a waterproofing laminate which will provide effective, dependable waterproofing to a roof, floor, below grade installation or other installaton making waterproofing characteristics desirable or necessary.

SUMMARY OF THE INVENTION

The present invention has solved the above-described problem. A waterproofing laminate comprises a reinforcing sheet, first bitumen layers secured to the surfaces of the reinforcing sheets, first and second compound bitumen layers secured to the first and second bitumen layers, an elastomeric sheet secured to one of the compound bitumen layers and a release sheet secured to the other. Removal of the release sheet permits the waterproofing laminate to be secured to a surface to be protected.

It is an object of the present invention to provide an improved waterproofing laminate which will resist undesired penetration of water and water vapor therethrogh.

It is another object of the present invention to provide a waterproofing laminate which will resist shrinking and wrinkling during application and following application.

It is a further object of the present invention to provide an assembly wherein factory labor is substituted to a major extent for field labor.

It is a further object of the invention to provide an assembly wherein securement of the waterproofing laminate will not alter the effectiveness as a result of the climatic conditions under which the installation is made.

It is a further object of the present invention to provide such an assembly which can be secured directly to a wide variety of materials, can be painted promptly after installation and need not be secured by mechanical fasteners on installations which slope.

It is a further object of the present invention to provide an adhesive which will not liquify under extreme high temperatures.

It is yet another object of the present invention to provide a multi-layered reinforced bituminous membrane which will resist deterioration under the influence of a wide variety of chemical elements, will have tensile and elongation properties such that wide variations in temperature and physical movement of building components will not destroy its effectiveness.

These and other objects of the invention will be more fully undersood from the following description of the invention on reference to the illustrations appended hereto.

BRIEF DESCRIPTION OF THE DRAWING

The drawing is a somewhat schematic cross-sectional illustration of a laminate of the present invention.

DESCRIPTION OF THE PREFERRED EMBODIMENTS

As is shown in the FIGURE, a reinforcing sheet 2 has layers of bitumen 4, 6 secured to opposed surfaces thereof. Layers of compound bitumen 8, 10 are secured respectively to the bitumen layers 4, 6. An elastomeric sheet 12 is secured to compound bitumen layer 10 and release sheet 14 is secured to compound bitumen layer 8. It is contemplated that the elastomeric sheet 12 will be exposed to the elements when the laminate is secured to a roof, floor or other building component. Application to the surface is made by removing release sheet 14 thereby exposing compound bitumen layer 8 which may then serve as an adhesive to bond the laminate to the surface to be protected. The elastomeric sheet preferably has certain characteristics including properties which resist bitumen attack. A suitable sheet for this purpose is that disclosed in U.S. Pat. No. 4,458,043 the disclosure of which is expressly incorporated herein by reference.

In general, it will be preferred that the elastomeric sheet 12 contain a material selected from the group consisting of polyisobutylene, chlorinated polyethylene, natural rubber, polyvinyl chloride and ethylene vinyl acetate. Ethylene propylene diene copolymer may also be used. A specifically preferred formulation for the elastomeric sheet 12 includes about 10 to 40 percent by weight of unplasticized polyvinyl chloride, about 10 to 40 percent by weight of an ethylene vinyl acetate carbon monoxide terpolymer and about 5 to 35 percent of coal tar pitch. The elastomeric sheet may also contain up to about 30 percent of particulate filler, up to about 25 percent of fibrous filler and up to about 15 percent primary or secondary plasticizer with or without up to about 10 percent of processing aids or stabilizers.

The amount of PVC is preferably in the range of about 20 to 30 percent by weight of the entire composition and may advantageously be provided as a suspension or emulsion grade of polyvinyl chloride. The ethylene vinyl acetate carbon monoxide terpolymer may contain about 15 to 85 percent ethylene, about 5 to 60 percent vinyl acetate and about 0.5 to 30 percent carbon monoxide, all on a weight basis. A suitable terpolymer for use in this context is that marketed by du Pont de Nemours E.I. & Company under the trade designation "Elvaloy" with the preference being for "Elvaloy 742".

With respect to the coal tar pitch constituent, it may be provided as such or in admixture with bitumen of natural or synthetic origin such as an unmodified or modified bitumen from the primary or secondary refining of petroleum. Any bitumen present in the coal tar pitch is preferably present in an amount of less than about 30 percent by weight of the pitch/bitumen mixture. The pitch preferably has a softening point (as determined by the ring and ball method) in the range of about 80 degrees C. to 150 degrees C. and preferably around 105 degrees C. It may preferably be that known as "electrode pitch".

The elastomeric sheet 12 preferably contains particulate and fibrous fillers. Among the suitable particulate fillers are reinforcing fillers such as carbon black, silica, zinc oxide, phenolic resin and magnesium carbonate. Among the nonreinforcing fillers, those preferred are calcium carbonate (whiting), barium sulphate, hydrated aluminum silicate, china clay and magnesium silicate. The total amount of particulate filler is preferably up to about 30 percent weight percent based upon total composition with a specific preference being for up to about 20 percent weight percent. Preferred fibrous fillers are natural fibers including inorganic or mineral fibers, wool and cotton, as monofilament or yarn and synthetic fibers, for example, nylon and polyester provided as monofilament or yarn. The fibrous fillers may conveniently be comminuted waste conveyor belting or other suitable waste fiber, if desired.

A suitable plasticizer for use in the polyvinyl chloride is preferably incorporated in the elastomeric sheet 12. It may be, for example, a phthalate ester, an ester of sebacic or adipic acid, a phosphate ester or oxidized soya bean oil. The plasticizer is preferably present in an amount of not more than about 8 percent by weight of the total composition.

Among the processing aids preferably employed are well known internal and external lubricants which have conventionally been employed in connection with polyvinyl chloride compounding. The composition is preferably provided with an amount of stabilizer to prevent degradation of the polyvinyl chloride or ethylene vinyl acetate carbon monoxide terpolymer during high temperature processing. The selection and quantity of such stabilizers are well known to those skilled in the art.

In making the material for use in the elastomeric sheet 12, the materials may be processed by mixing in a compounding roll mill such as a Buss Ko Kneader or a Banbury type mixer and may be converted to sheet form by calendering or extrusion.

The elastomeric sheet 12 may comprise or be laminated with a reinforcing fabric such as a woven or non-woven polyester or glass scrim. A suitable thickness for the sheeting is about 0.0020 of an inch to 0.0060. The reinforcing sheet 2 may be of the type disclosed in U.S. Pat. Nos. 4,055,453 and 4,091,135.

The reinforcing sheet 2 may be selected from those which have come into common use for the ordinary bituminous roof membrane such as a class fleece or non-woven fabric composed of synthetic fiber as well as previously known material such as paper, felt, fabric or cloth composed of organic or inorganic fiber such as, for example, rag felt, asbestos felt, cotton fabric or jute cloth. Generally when fibrous sheets are used they are impregnated with molten bitumen in order to seal the vids therein before the reinforcing sheet 2 is subjected to coating with molten bitumen. The reinforcing sheet 2 may also be provided from synthetic polymer film or metal foil such as aluminum foil or copper foil. When such film or foil is used the pre-impregnation treatment with bitumen is not necessary. If desired, suitable physical or chemical treatment as by sandblasting, etching or the like may be provided to establish a good affinity with bitumen before subjecting the reinforcing sheet 2 to a layer of molten bitumen.

The reinforcing sheet 2 is covered on one surface or both surfaces with bitumen and all or part of the bitumen coated layer is laminated with compound bitumen that may be denatured bitumen prepared to impart high tackiness at ambient temperature as a result of blending of the same with natural or synthetic rubber or natural or synthetic resins or both. See U.S. Pat. No. 4,039,706, the disclosure of which is incorported herein by reference.

It is preferred that the layers of bitumen and layers of compound bitumen be applied in the form of a coating with the former having a thickness of about 0.001 to 0.015 inch and preferably about 0.0025 to 0.007 inch and the latter having a thickness of about 0.001 to 0.015 inch and preferably 0.0025 to 0.007 inch.

The blending materials should be selected so as to effect a denaturing and enhancement of properties of the bitumen particularly in respect to temperature susceptibility. With respect to rubber, the preferred materials for use for this purpose are vulcanized or nonvulcanized rubber composed of various types of synthetic rubber such as styrene-butadiene rubber, acrylonitrile-butadiene rubber, chloroprene rubber, butadiene rubber, isoprene rubber, butyl rubber, ethylenepropylene rubber, ethylene-propylene diene mar, polyisobutylene, chlorinated polyethylene and natural rubber. Among the natural or synthetic resins preferred for this purpose are rosin, rosin derivatives such as estergum, tall oil, cumarone-indene resin, petroleum resins and polyolefin such as polybutene. It is preferred that the total amount of rubber, resin or combinations of both present in the compound bitumen layer be around 15 to 50 percent by weight.

If desired, these rubber and resin blending materials may be partially substituted for by animal or vegetable oils and fats as these oils and fats also are effective for increasing the tackiness of the bitumen. Among the oils and fats which are suitable for this purpose are animal oils and fats such as fish oil, whale oil, beef tallow and the like as well as vegetable oil such as linseed oil, tung oil, sesame oil, cottonseed oil, soyabeam oil, olive oil, castor oil and the like. They also may include materials such as stand oil, oxidized oil and boiled oil made therefrom as well as fatty acid pitch and the like. The quantity of these oils and fats is preferably less than 50 percent by weight of the total quantity of rubber and/or resin and oils and fats added.

Also, if desired, a softener such as petroleum oil, or a filler such as mica powder can be incorporated into the compound bitumen.

Release sheet 14 is provided over one surface of the compound bitumen 8 in order to protect it from inadvertent contact with surfaces other than the surface sought to be protected. The release sheet 14 may advantageously be composed of cellophane, polyvinyl alcohol film or aluminum foil. It may also take the form of a treated sheet such as film, foil, paper and the like subjected to surface treatment as by coating or impregnated with synthetic resins having high releasing property such as silicone resin, flourine-containing resin and polyvinylidene chloride.

EXAMPLE

In order to provide a further understanding of the invention, an example will be considered. A reinforcing sheet 2 consisting of a biaxial crosslaminated polyethylene film is unrolled from a roll and passes through coating rollers where the sheet is coated totally or partially on both sides with a straight run of oxidized bitumen at 220 degrees C. to a thickness of about ⅔ mm. Two release sheets such as paper are separately conducted to respectively independent roller coater assemblies where a molten compound containing, for example, about 20 percent by weight of rubber and/or resins and is maintained at about 200 degrees C. is provided. The release paper is coated on the releasable face of each releasable sheet with the compound bitumen so as to form a coated layer of a suitable thickness of about, for example, 0.3 to 0.5 mm. The reinforcing sheet is coated with bitumen on both surfaces and the bitumen surfaces of the coated reinforcing sheet placed in contact with the compound bitumen coated surface of a release sheet to thereby establish a compound bitumen-bitumen interface. The release paper is then removed from one surface and the elastomeric sheet is subsequently adhered to that surface by interfacing the elastomeric sheet with the compound bitumen on that surface. The entire assembly is then subjected to a pressure of about 50 psi by passing it through pressure rollers.

In general, it will be preferred that the bitumen and compound bitumen layers be applied continuously to the respective surfaces in order to provide uniform laminate.

In applying the laminate to a roof, floor or other structure one need merely remove the release paper 14 thereby exposing the compound bitumen layer 8 permitting the adhesive compound bitumen 8 to be applied in surface-to-surface contact with the surface to be protected. With the application of slight pressure, the installation is complete.

It will be appreciated that the membrane laminate of the present invention provides an effective means for substituting factory labor for field labor in producing a product of desirable uniform characteristics eliminating the numerous undesirable aspects of the prior art products and methods as discussed hereinbefore.

Whereas particular embodiments of the invention have been described above for purposes of illustration it will be evident to those skilled in the art that numerous variations of the details may be made without departing from the invention as defined in the appended claims.

I claim:
1. A waterproof laminate comprising
   a reinforcing sheet,
   a first bitumen layer secured to one surface of said reinforcing sheet,
   a second bitumen layer secured to the other surface of said reinforcing sheet,
   a first compound bitumen layer secured to said first bitumen layer
   a second compound bitumen layer secured to said second bitumen layer,
   said first and second compound bitumen layer containing a material selected from the group consisting of natural rubber, synthetic rubber, natural resin, and synthetic resin,
   said elastomeric sheet containing a material selected from the group consisting of polyisobutylene, chlorinated polyethylene, natural rubber, polyvinyl chloride and ethylene vinyl acetate,
   an elastomeric sheet secured to said first compound bitumen layer, and
   a release sheet secured to said second compound bitumen layer, whereby removal of said release sheet will permit securement of said waterproofing laminate to a surface.
2. The waterproofing laminate of claim 1 including said reinforcing sheet is composed of a material selected from the group consisting of synthetic polymer fiber, metal foil and bitumen impregnated fiber sheets.
3. The waterproofing laminate of claim 1 including
   said first and second bitumen compound containing about 15 to 50 percent by weight of said natural rubber, synthetic rubber, natural resin or synthetic resin.
4. The waterproofing laminate of claim 3 including
   said bitumen layers being substantially continuous, and
   said compound bitumen layers being substantially continuous.
5. The waterproofing laminate of claim 4 including
   said bitumen layers and said compound bitumen layers being coatings.

* * * * *

UNITED STATES PATENT AND TRADEMARK OFFICE
CERTIFICATE OF CORRECTION

PATENT NO. : 4,755,409

DATED : July 5, 1988

INVENTOR(S) : ALEX W. HARKNESS

It is certified that error appears in the above-identified patent and that said Letters Patent is hereby corrected as shown below:

Col. 1, line 39, "securd" should be --secured--.

Col. 1, line 57, "installaton" should be --installation--.

Col. 2, line 6, "therethrogh" should be --therethrough--.

Col. 3, line 8, insert --of-- after "percent".

Col. 3, line 54, "adipie" should be --adipic--.

Col. 4, line 19, "vids" should be --voids--.

Col. 4, line 46, "to" should be --of--.

Col. 5, line 1, "soyabeam" should be --soyabean--.

Col. 5, line 36, "releasable" (second occurrence) should be --release--.

Signed and Sealed this

Third Day of January, 1989

Attest:

DONALD J. QUIGG

Attesting Officer

Commissioner of Patents and Trademarks